(12) United States Patent
Wu

(10) Patent No.: US 11,523,884 B2
(45) Date of Patent: Dec. 13, 2022

(54) COMBINED ASSEMBLY FOR DENTAL PROSTHESIS

(71) Applicant: TAIWAN NIPPON DENTAL ALLIANCE CO., LTD., Taipei (TW)

(72) Inventor: Wen-Yuen Wu, Taipei (TW)

(73) Assignee: TAIWAN NIPPON DENTAL ALLIANCE CO., LTD., Taipei (TW)

( * ) Notice: Subject to any disclaimer, the term of this patent is extended or adjusted under 35 U.S.C. 154(b) by 116 days.

(21) Appl. No.: 17/013,605

(22) Filed: Sep. 6, 2020

(65) Prior Publication Data
US 2021/0220091 A1 Jul. 22, 2021

(30) Foreign Application Priority Data
Jan. 17, 2020 (TW) .................................. 109101786

(51) Int. Cl.
*A61C 8/00* (2006.01)
(52) U.S. Cl.
CPC .......... *A61C 8/0057* (2013.01); *A61C 8/0068* (2013.01); *A61C 8/0093* (2013.01)
(58) Field of Classification Search
CPC .............................................. A61C 8/00–0098
See application file for complete search history.

(56) References Cited

U.S. PATENT DOCUMENTS

| | | | | |
|---|---|---|---|---|
| 5,195,891 A | * | 3/1993 | Sulc ...................... | A61C 8/0069 |
| | | | | 433/173 |
| 5,417,570 A | * | 5/1995 | Zuest .................. | A61C 13/2656 |
| | | | | 433/172 |
| 5,782,918 A | | 7/1998 | Klardie et al. | |
| 7,338,286 B2 | * | 3/2008 | Porter .................. | A61C 8/0066 |
| | | | | 433/172 |
| 9,579,168 B2 | * | 2/2017 | Thome ................. | A61C 8/0028 |
| 10,952,825 B2 | | 3/2021 | Park | |
| 11,207,160 B2 | * | 12/2021 | Richard ............... | A61C 8/0056 |
| 2016/0317253 A1 | | 11/2016 | Duerr | |
| 2017/0165035 A1 | * | 6/2017 | Niznick ................ | G09B 23/28 |
| 2021/0220092 A1 | * | 7/2021 | Wu ...................... | A61C 8/0039 |

FOREIGN PATENT DOCUMENTS

| | | |
|---|---|---|
| DE | 10333013 A1 | 2/2005 |
| DE | 102010060567 A1 | 5/2012 |
| JP | H06505645 A | 6/1994 |
| JP | 2015139705 A | 8/2015 |
| JP | 2017500135 A | 1/2017 |
| JP | 2019524384 A | 9/2019 |

* cited by examiner

*Primary Examiner* — Yogesh P Patel

(74) *Attorney, Agent, or Firm* — Mark M. Friedman

(57) ABSTRACT

A combined assembly for dental prosthesis is provided, wherein the combined assembly includes a first joint member and a second joint member. The first joint member has a first body and a plurality of elastic hooks, and the elastic hooks are annularly arranged to connect one end of the first body, wherein a slot is disposed between the adjacent elastic hooks, and each of the hook has a top portion protruding outward. The second joint member has a second body, and the second body is provided with a joint hole, a side wall surface of which is provided with a ring groove, wherein the elastic hooks extend into the joint holes, and the top portions of the elastic hooks engage into the ring groove.

14 Claims, 11 Drawing Sheets

COMBINED ASSEMBLY FOR DENTAL PROSTHESIS

CROSS REFERENCE TO RELATED APPLICATION

This application claims the priority of Taiwan Patent Application No. 109101786, filed on Jan. 17, 2020, the disclosure of which is incorporated herein by reference.

FIELD OF INVENTION

The present disclosure relates to a combined assembly, and in particular, relates to a combined assembly for dental prosthesis.

BACKGROUND OF INVENTION

Dentures can be divided into movable dentures and fixed dentures, wherein means for fixing dentures include braces, bridges, metal buckle hooks, magnets and dental implants.

In dental bridge, the ends of three or more dentures in a row fit healthy teeth to distribute the force applied to the dentures to the left and right real teeth. However, in order to install the dentures by means of dental bridges, the left and right ends of the healthy teeth need to be trimmed for the connection of the dentures. During chewing or biting, the left and right ends of the dentures need to share the force that the missing teeth originally have to bear. For example, if three of the five side-by-side teeth are missing, the left and right teeth share the bite force of the five teeth, thereby damaging the left and right teeth and alveolar bone for a long time. As a result, the placement of the dental bridge is likely to cause lesions in the original two healthy teeth.

In order to avoid the above-mentioned problems of the dental bridge, another approach is an implant-type dental prosthesis. Installing the implant-type dental prosthesis is to implant an implant into the alveolar bone at a position of the missing tooth, and then fix the dental prosthesis assembly on the implant to form a complete dental prosthesis. However, the implant-type dental prosthesis is a fixed dental prosthesis, and the installation process is complicated and cumbersome. The implant-type dental prosthesis has disadvantages of uneasy clean, installation and repair.

SUMMARY OF INVENTION

In order to improve the shortcomings of conventional technology, the present disclosure aims to develop a combined assembly for dental prosthesis in a snap-fit method, wherein at least two detachable or combinable components are used to form the combined assembly of the present disclosure.

The object of the present disclosure is to provide a combined assembly for dental prosthesis that is easily installed.

Another object of the present disclosure is to provide a combined assembly for dental prosthesis with excellent coupling strength.

Another object of the present disclosure is to provide a combined assembly for dental prosthesis, which may be combined with a real tooth or an implant.

In order to achieve that above object, in one embodiment, a combined assembly for dental prosthesis of the present disclosure includes a first joint member, a second joint member, and a supporting member. The first joint member includes a first body and a plurality of elastic hooks, wherein the elastic hooks are annularly arranged to connect one end of the first body, a slot is disposed between the adjacent elastic hooks, and each of the elastic hooks includes a top portion protruding outward. The second joint member includes a second body, wherein the second body is provided with a joint hole, a side wall surface of the joint hole is provided with a ring groove, the elastic hooks extend into the joint hole, and the top portions of the elastic hooks engage into the ring groove. The supporting member includes a filling portion and a stopping portion, wherein the first joint member is provided with a through hole, the filling portion is filled into the through hole, and the stopping portion is located inside the elastic hooks. By snapping the top portions of the elastic hooks into the ring groove to form an excellent bonding strength.

In one embodiment, the first body is provided with an annular groove configured to tightly combine with dental prosthesis and other components.

In one embodiment, the second body is provided with an extension portion on a side of the joint hole, and the extension portion is provided with a screw, which is easily combined with the dental implant.

In one embodiment, a driving portion is provided at a bottom of the joint hole, by which tools such as wrenches may be used to drive the second body to rotate and lock.

In one embodiment, the combined assembly further comprises a third joint member, the third joint member is provided with a matching hole and a bolt, the screw is combined with the matching hole, and the bolt is drilled into a skeleton.

In one embodiment, a guide surface is provided on an outer end of each of the elastic hooks, wherein the guide surface uses the inclined surface principle to make the elastic hooks smoothly slide into the joint hole.

In one embodiment, the joint hole is a tapered hole, and the guide surface is elastically deformed by compression of the tapered hole during a jointing process of the first joint member and the second joint member. Through the cooperation of the tapered hole and the guide surface, it is easier to make the elastic hooks smoothly slide into the joint hole.

In one embodiment, the combined assembly further comprises a restraining ring, and an outer surface of the first joint member and an outer surface of the second joint member are sleeved by the restraining ring. The restraining ring forms an outer bundle of the first joint member and the second joint member without radial oscillation.

In one embodiment, the first body is provided with a concave hole, and the second body is provided with a convex block corresponding to the concave hole.

In one embodiment, the first body is provided with an external thread, which may be tightly combined with components such as dental prosthesis in a locked manner and is not easily disengaged.

In one embodiment, a via hole is provided at a bottom of the joint hole of the second body, which may enable the second body to be combined with other elements or teeth by other methods.

In one embodiment, a hooking surface is provided on an outer surface of each of the elastic hooks, and the hooking surface forms a curved surface connected to the top portion. By the arc-shaped hooking surface buckled on the opening corner of the ring groove, the friction force may be increased.

In one embodiment, a plurality of protrusions are provided on an outer surface of the restraining ring, thereby increasing the bonding strength.

In one embodiment, a gap is formed between the stopping portion and each of the elastic hooks.

DETAILED DESCRIPTION OF PREFERRED EMBODIMENTS

Figure 1:
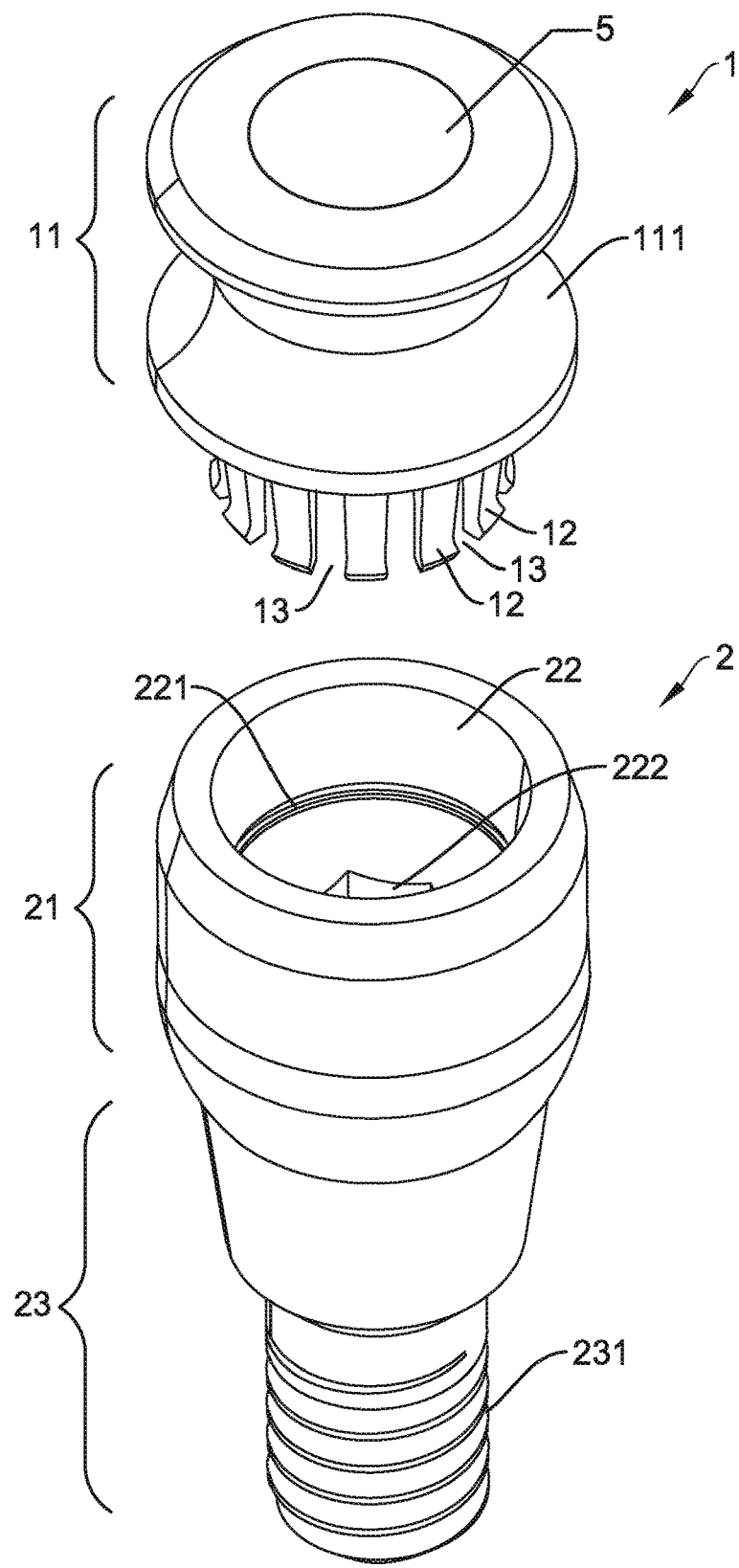
FIG. 1 is an exploded perspective diagram according to a combined assembly for dental prosthesis of a first embodiment of the present disclosure.
Figure 2:
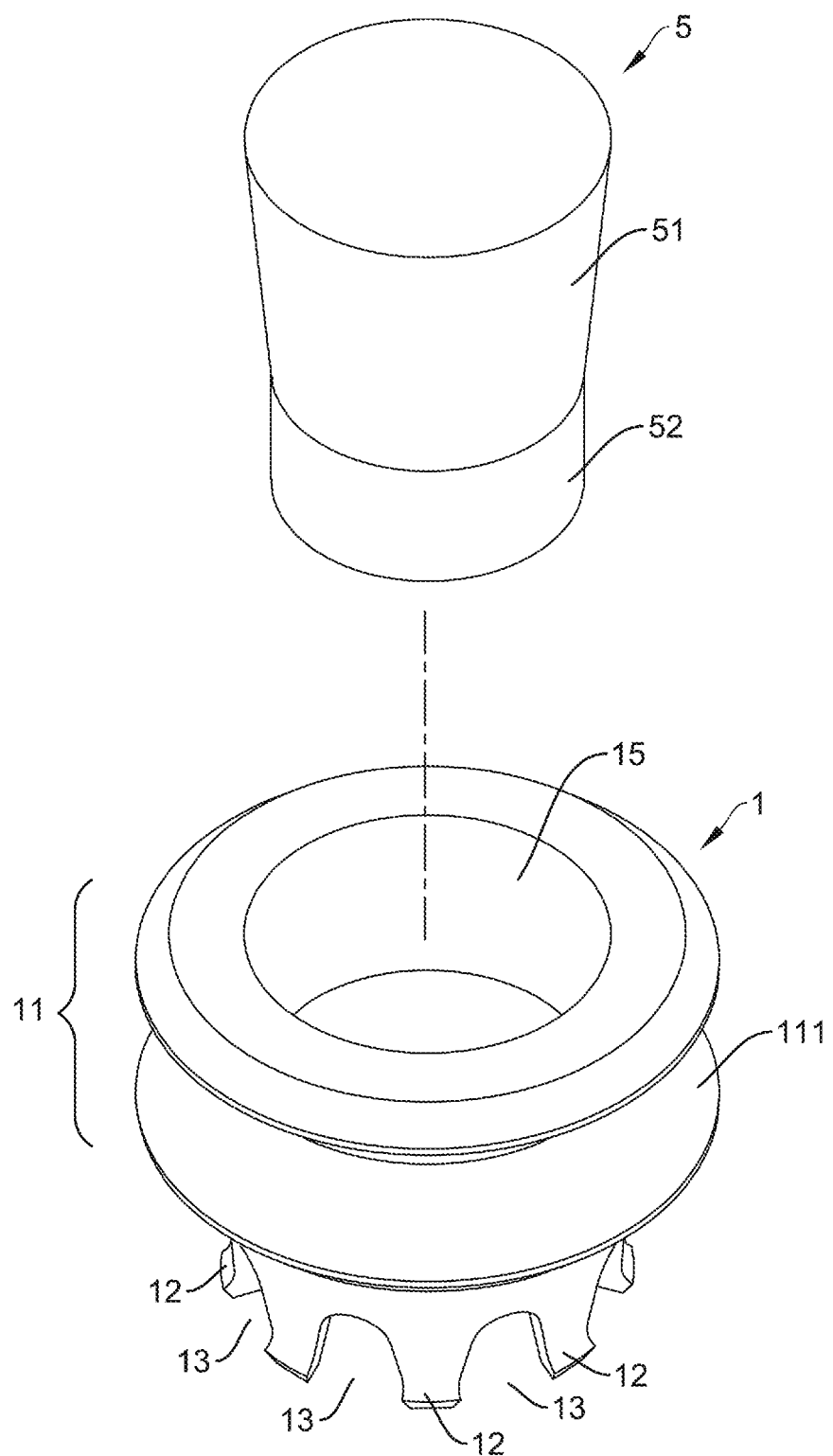
FIG. 2 is an exploded perspective diagram according to a first joint member of the combined assembly for dental prosthesis of the first embodiment of the present disclosure.
Figure 3:
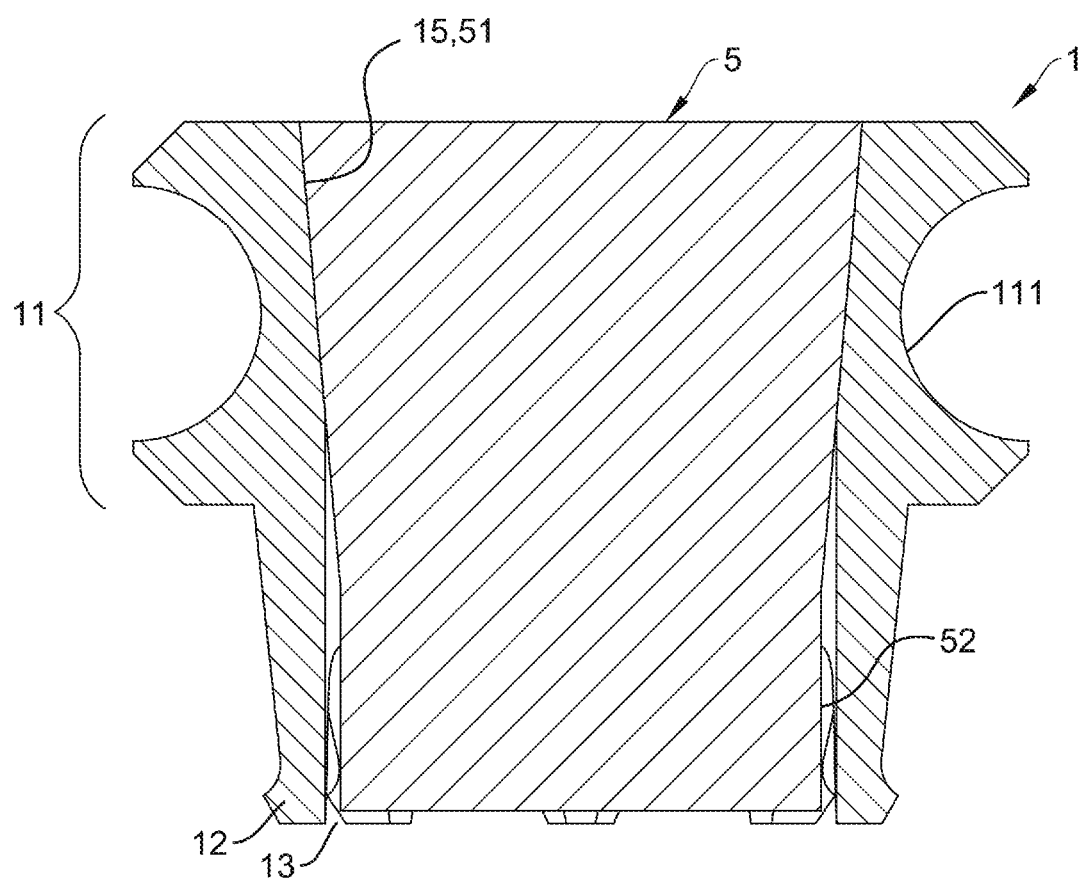
FIG. 3 is a cross-sectional diagram according to the combined assembly for dental prosthesis of the first embodiment of the present disclosure.
Figure 4:
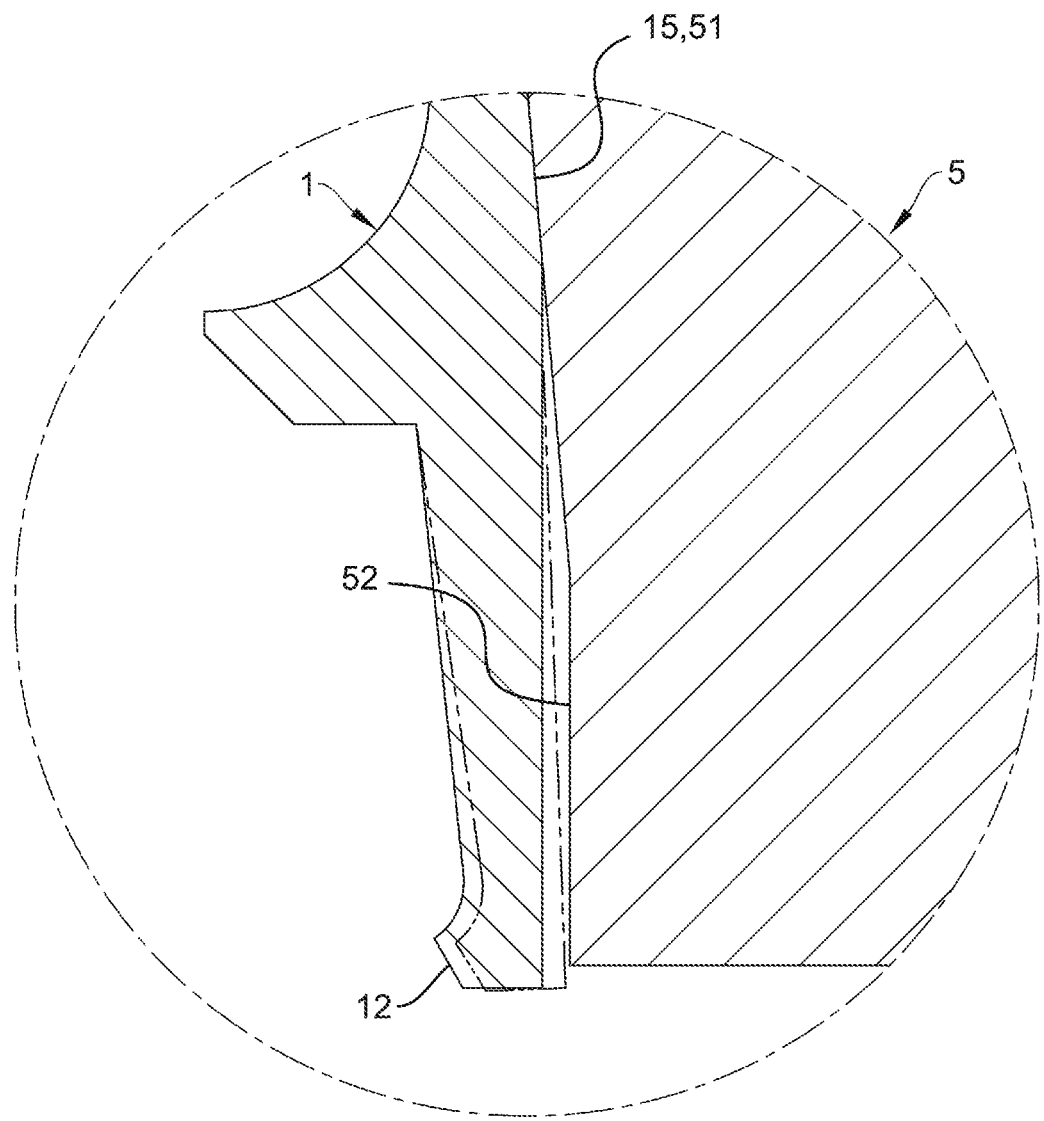
FIG. 4 and FIG. 5 are a partially enlarged diagrams according to the combined assembly for dental prosthesis of the first embodiment of the present disclosure.
Figure 5:
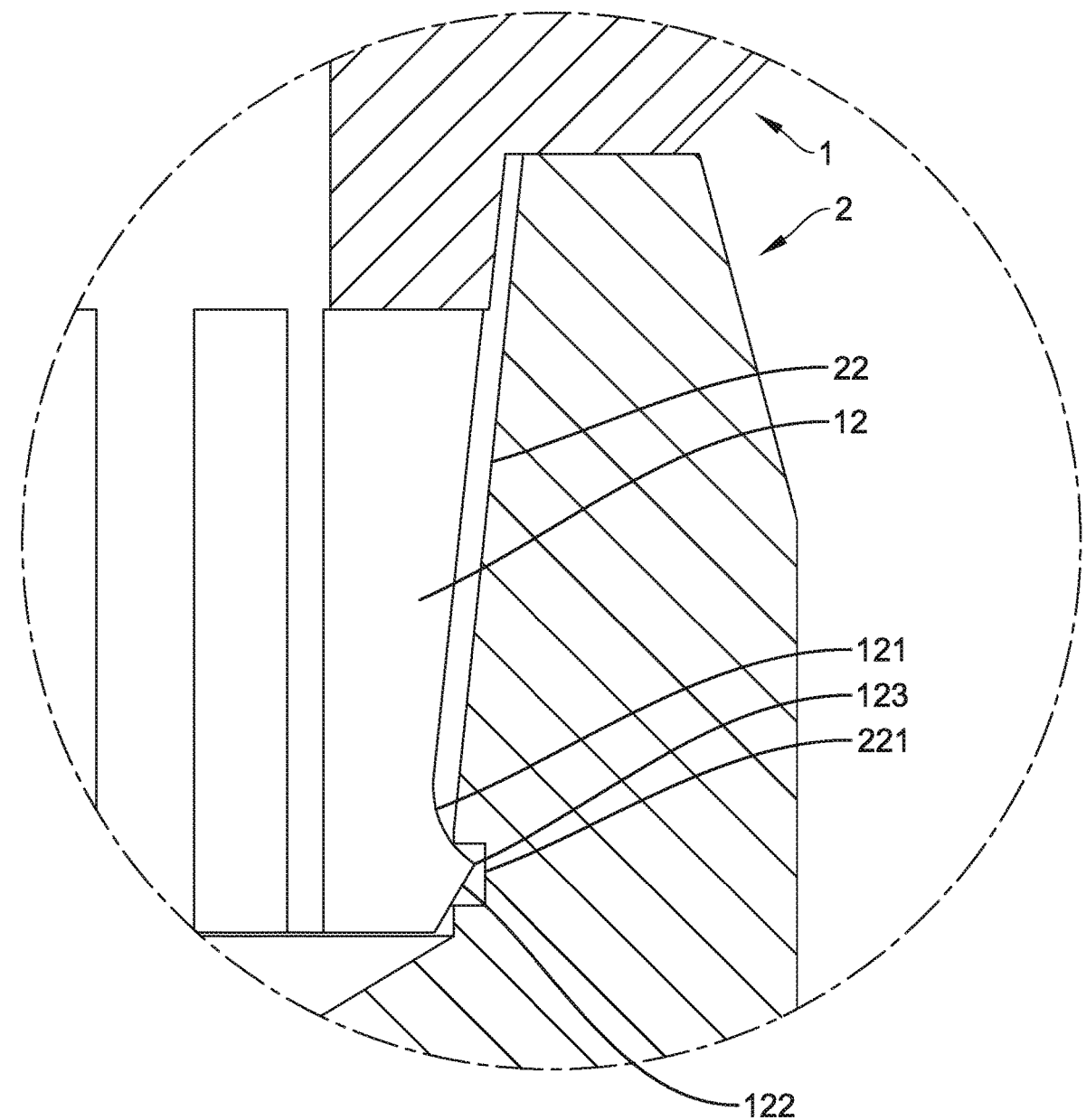

The technical solutions in the embodiments of the present disclosure will be described clearly and completely below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without making creative work fall within the protection scope of the present disclosure.

Referring to FIG. 1 to FIG. 5, a combined assembly for dental prosthesis of a first embodiment of the present disclosure comprises a first joint member 1 and a second joint member 2. The first joint member 1 includes a first body 11 and a plurality of elastic hooks 12, wherein the elastic hooks 12 are annularly arranged to connect one end of the first body 11, a slot 13 is disposed between the adjacent elastic hooks 12, and each of the elastic hooks 12 includes a top portion 123 protruding outward. The second joint member 2 includes a second body 21, wherein the second body 21 is provided with a joint hole 22, a side wall surface of the joint hole 22 is provided with a ring groove 221, the elastic hooks 12 extend into the joint hole 22, and the top portions 123 of the elastic hooks 12 engage into the ring groove 221. By engaging the top portions 123 of the elastic hooks 12 into the ring groove 221, an excellent bonding strength is formed.

Furthermore, the elastic hooks 12 of the first joint member 1 may cause material fatigue after many years of use. As a result, the rigidity of the elastic hooks 12 may be reduced. During chewing, the top portions 123 may accidentally disengage from the ring groove 221 and the dental prosthesis may fall off. In order to prevent the above situation, the first joint member 1 is provided with a through hole 15 in the first embodiment. The combined assembly further includes a supporting member 5, and the supporting member 5 is disposed in the through hole 15 to resist the retracted elastic hooks 12.

Preferably, in the first embodiment, the combined assembly includes the supporting member 5, and the supporting member 5 includes a filling portion 51 and a stopping portion 52, wherein the first joint member 1 is provided with the through hole 15, the filling portion 51 is filled into the through hole 15, and the stopping portion 52 is located inside the elastic hooks 12. The filling portion 51 and the through hole 15 are preferably push-tapered, but it is not limited thereto.

Preferably, a gap is formed between the stopping portion 52 and each of the elastic hooks 12. During the process of installing the dental prosthesis, the elastic hooks 12 still have an appropriate deformation space and are elastically deformed. The stopping portion 52 with the gap is supported by the inner side of the elastic hooks 12. When the deformation amount of the elastic hooks 12 exceeds the gap, the stopping portion 52 may resist retreating of the elastic hooks 12 and prevent accidental detachment of the dental prosthesis.

The material of the first joint member 1 needs to have high strength and appropriate elasticity. Preferably, the first joint member 1 is made of titanium metal or tis alloy, but it is not limited thereto. The first joint member 1 includes the first body 11 and the elastic hooks 12, wherein the first body 11 preferably forms a cylinder, which may be a right cylinder as shown in the figure, or a non-circular cylinder to avoid arbitrary rotation of a single dental prosthesis. Preferably, the first body 11 is provided with an annular groove 111, and the annular groove 111 is disposed on the outer surface of the first body 11, so that the annular groove 111 may be tightly combined with components, such as the dental prosthesis and is not easily detached. For example, the first body 11 may be embedded in the dental prosthesis to form an integrated structure with the dental prosthesis, and the annular groove 111 may ensure that the first joint member 1 will not be detached from the dental prosthesis.

Figure 6:
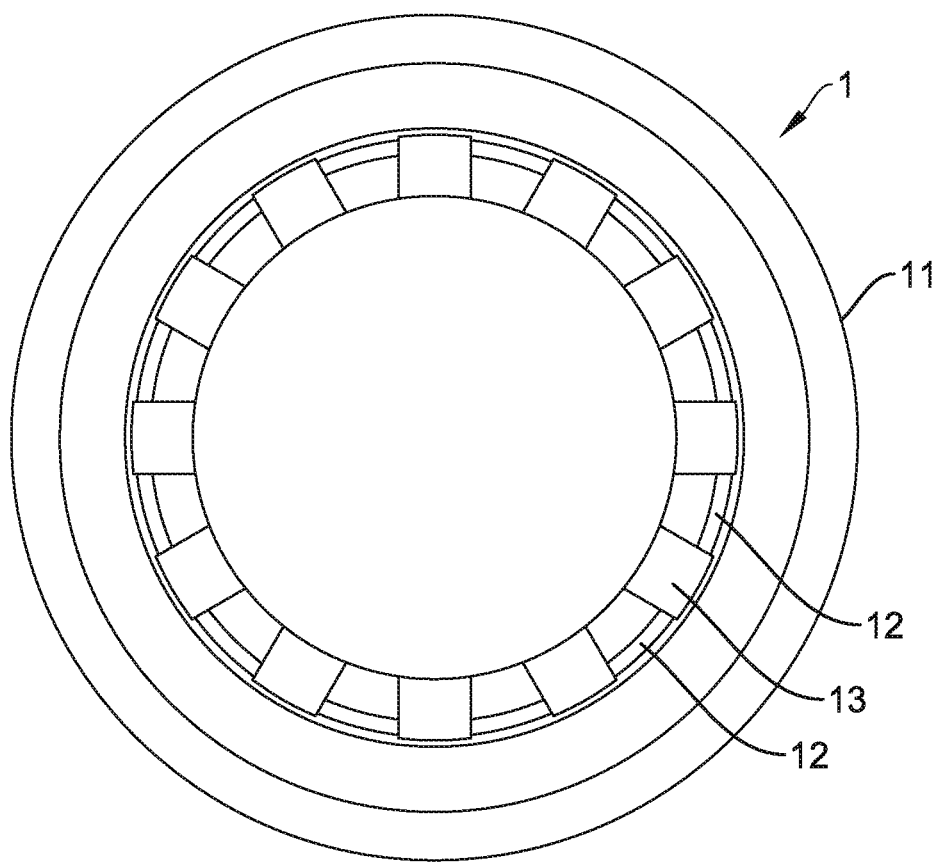
FIG. 6 is a top view of the first joint member of the combined assembly for dental prosthesis of the first embodiment of the present disclosure.

The elastic hooks 12 are annularly arranged to connect one end of the first body 11, a slot 13 is disposed between the adjacent elastic hooks 12, and each of the elastic hooks 12 includes a top portion 123 protruding outward. As shown in FIG. 6, a top view of the first joint member of the combined assembly for the dental prosthesis of the first embodiment of the present disclosure is illustrated. In the first embodiment, the number of the elastic hooks 12 is twelve. Preferably, the number of the elastic hooks 12 is 8 to 16, thereby obtaining desirable strength and proper elasticity.

The material of the second joint member 2 needs to have high strength, and the second joint member 2 is preferably made of titanium metal or its alloy, but not limited thereto. The second joint member 2 includes the second body 21, wherein the second body 21 is provided with the joint hole 22, a side wall surface of the joint hole 22 is provided with the ring groove 221. The depth of the ring groove 221 is equal to the distance between the elastic hooks 12 and the top portions 123. When the elastic hooks 12 extend into the joint hole 22, the elastic hooks 12 are constrained by the joint hole 22 and elastically deforms to bend inward. When the elastic hooks 12 extend into the bottom of the joint hole 22, the first body 11 is in contact with the second body 21, and the elastic hooks 12 are elastically reset and expand outward so that the top portions 123 are caught in the ring groove 221.

The elastic hooks 12 extend into the joint hole 22, and the top portions 123 of the elastic hooks 12 engage the ring groove 221. By engaging the top portions 123 of the elastic hooks 12 into the ring groove 221, an excellent bonding strength is formed.

Preferably, a hooking surface 121 is provided on an outer surface of each of the elastic hooks 12, and the hooking surface 121 forms a curved surface connected to the top portion 123. By the arc-shaped hooking surface 121 buckled on the opening corner of the ring groove 221, the arc-shaped hooking surface 121 forms a larger contact angle with respect to the opening corner of the ring groove 221 in the disengagement direction, and the friction force may be increased.

In the embodiment, a guide surface 122 is preferably provided on an outer end of each of the elastic hooks 12, wherein the guide surface 122 uses the inclined surface principle to make the elastic hooks 12 smoothly slide into the joint hole 22.

In the embodiment, the joint hole 22 is preferably a tapered hole, and the guide surface 122 is elastically deformed by compression of the tapered hole during a jointing process of the first joint member 1 and the second joint member 2. Through the cooperation of the tapered hole and the guide surface 122, it is easier to make the elastic hooks 12 smoothly slide into the joint hole 22.

In the embodiment, the second body 21 is preferably provided with an extension portion 23 on a side of the joint hole 22, and the extension portion 23 is provided with a screw 231, and it is easily combined with the dental implant through disposing the screw 231.

In the embodiment, a driving portion 222 is preferably provided on a bottom of the joint hole 22, and the driving portion 22 may be a hexagon socket wrench hole, a slotted slot, a cross slot, etc., and whereby the wrench or screwdriver may be used to drive the second body to rotate and lock.

Figure 7:
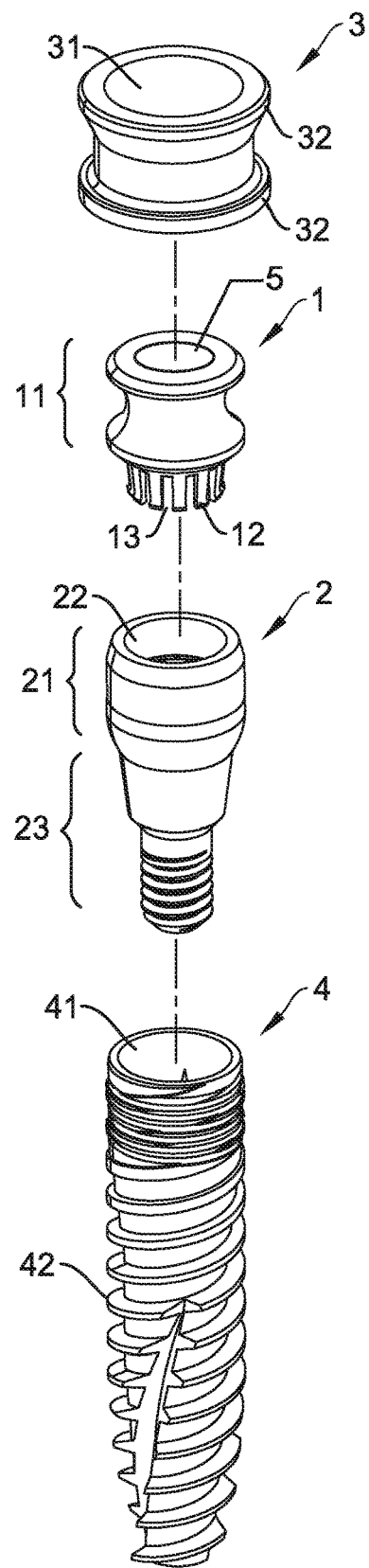
FIG. 7 is an exploded perspective diagram according to a combined assembly for dental prosthesis of a second embodiment of the present disclosure.
Figure 8:
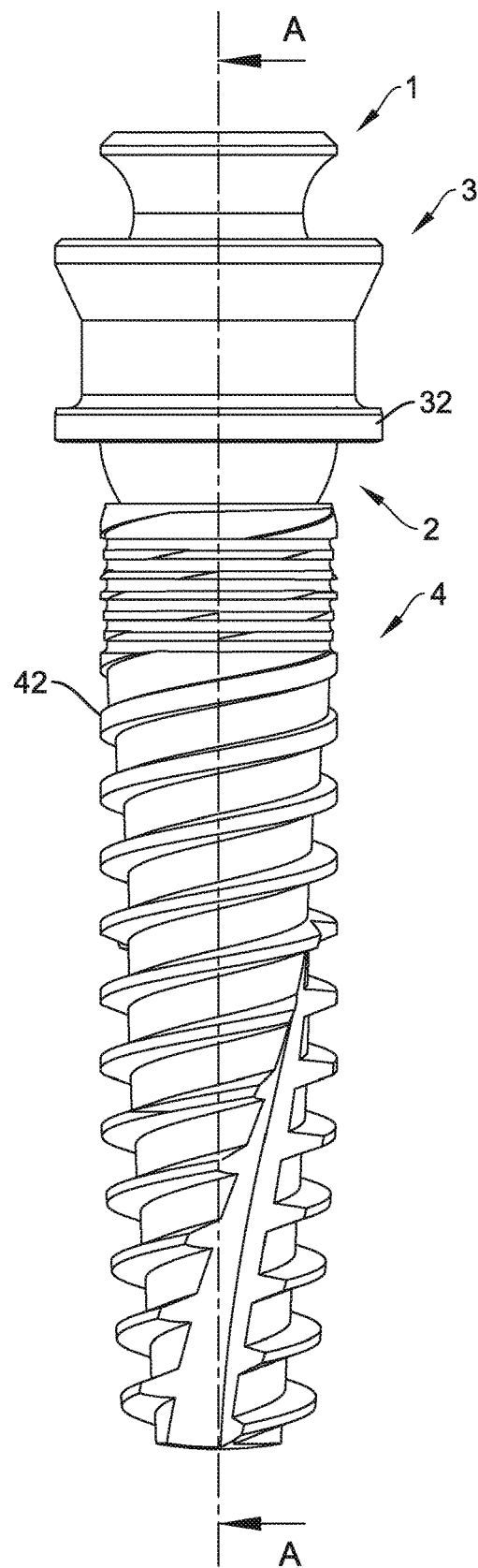
FIG. 8 is a front view according to the combined assembly for dental prosthesis of the second embodiment of the present disclosure.

Referring to FIG. 7 and FIG. 8, a combined assembly for dental prosthesis of a second embodiment of the present disclosure is illustrated. The structures of the first joint member 1 and the second joint member 2 are the same as those in the previous embodiment, wherein the combined assembly further comprises a restraining ring 3 or a third joint member 4.

In the embodiment, the restraining ring 3 is preferably made of a material with high rigidity. For example, the restraining ring 3 is made of titanium metal or its alloy or ceramic material, but it is not limited thereto. An outer surface of the first joint member 1 and an outer surface of the second joint member 2 are sleeved by the restraining ring 3. The restraining ring 3 forms an outer bundle of the first joint member 1 and the second joint member 2 without radial oscillation, so that the present disclosure has better lateral strength The restraining ring 3 is provided with a passing hole 31 in the center, and the outer surfaces of the first joint member 1 and the second joint member 2 together may be sleeved through the passing hole 31. The diameter of the passing hole 31 is preferably the same as the outer diameters of the first joint member 1 and the second joint member 2, so that they are tightly coupled to achieve a restraining effect.

A plurality of protrusions 32 are provided on an outer surface of the restraining ring 3, and the protrusions 32 are disposed on the outer surface of the restraining ring 3, for tightly combining the dental prosthesis and other components without detachment. For example, the restraint ring 3 may be embedded in the dental prosthesis to form an integral structure with the dental prosthesis, and the protrusions 32 are able to ensure that the restraint ring 3 will not be detached from the dental prosthesis.

In the embodiment, the combined assembly further comprises a third joint member 4, and the third joint member 4 is provided with a matching hole 41 and a bolt 42. The screw 231 is combined with the matching hole 41, and the bolt 42 is drilled into a skeleton. The matching hole 41 may form a screw hole, so that the screw 231 is combined with the matching hole 41 in a spiral manner.

Figure 9:
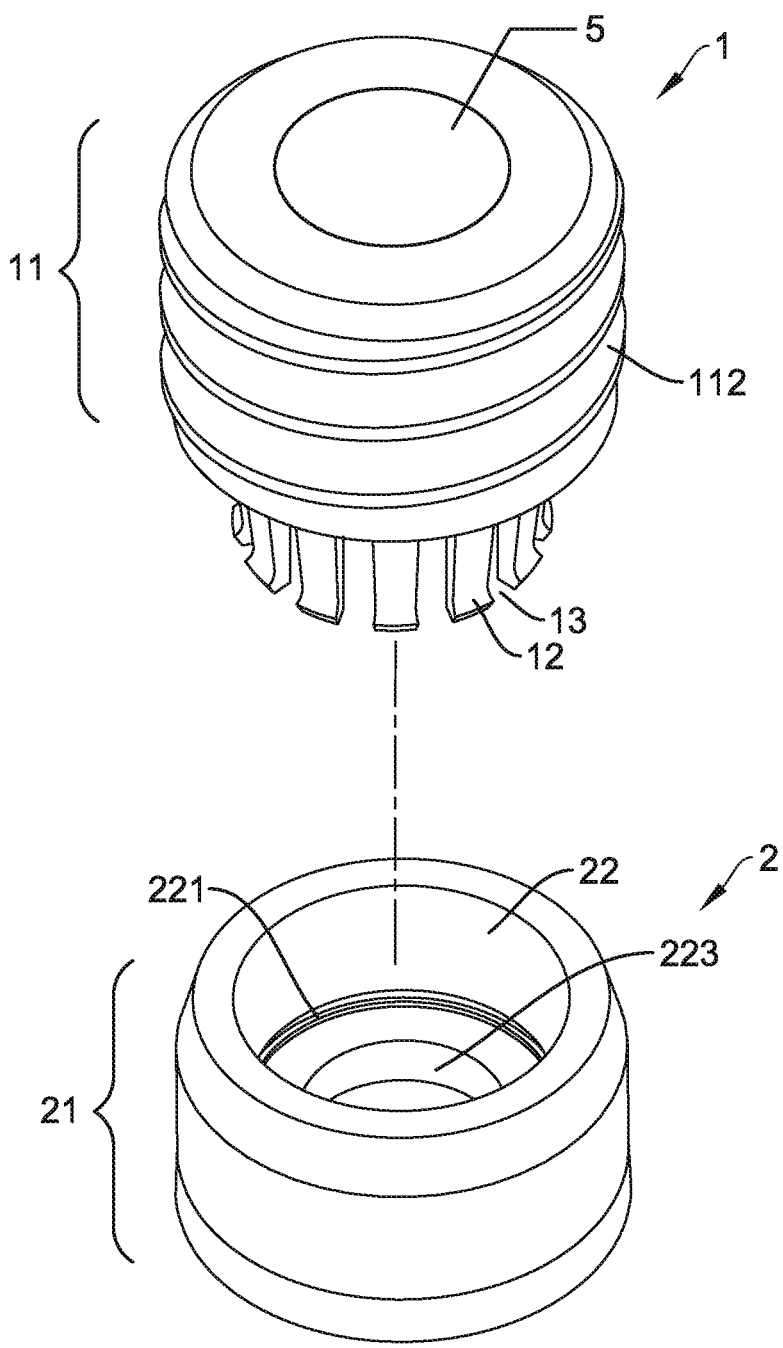
FIG. 9 is an exploded perspective diagram according to a combined assembly for dental prosthesis of a third embodiment of the present disclosure.

Referring to FIG. 9, a combined assembly for dental prosthesis of a third embodiment of the present disclosure is illustrated. The difference from the first embodiment is that the outer surface of the first body 11 may be provided with an external thread 112. The external thread 112 may be tightly combined with other dental prosthesis or implants and other components in a locked manner, which is easily assembled and not easily detached.

In the embodiment, the other difference from the first embodiment is that a via hole 223 is provided on a bottom of the joint hole 22 of the second body 21, and the via hole 223 passes through the bottom of the second body 21. By the arrangement of the via hole 223, the second body 21 may be combined with other elements or teeth by other methods such as screws.

Figure 10:
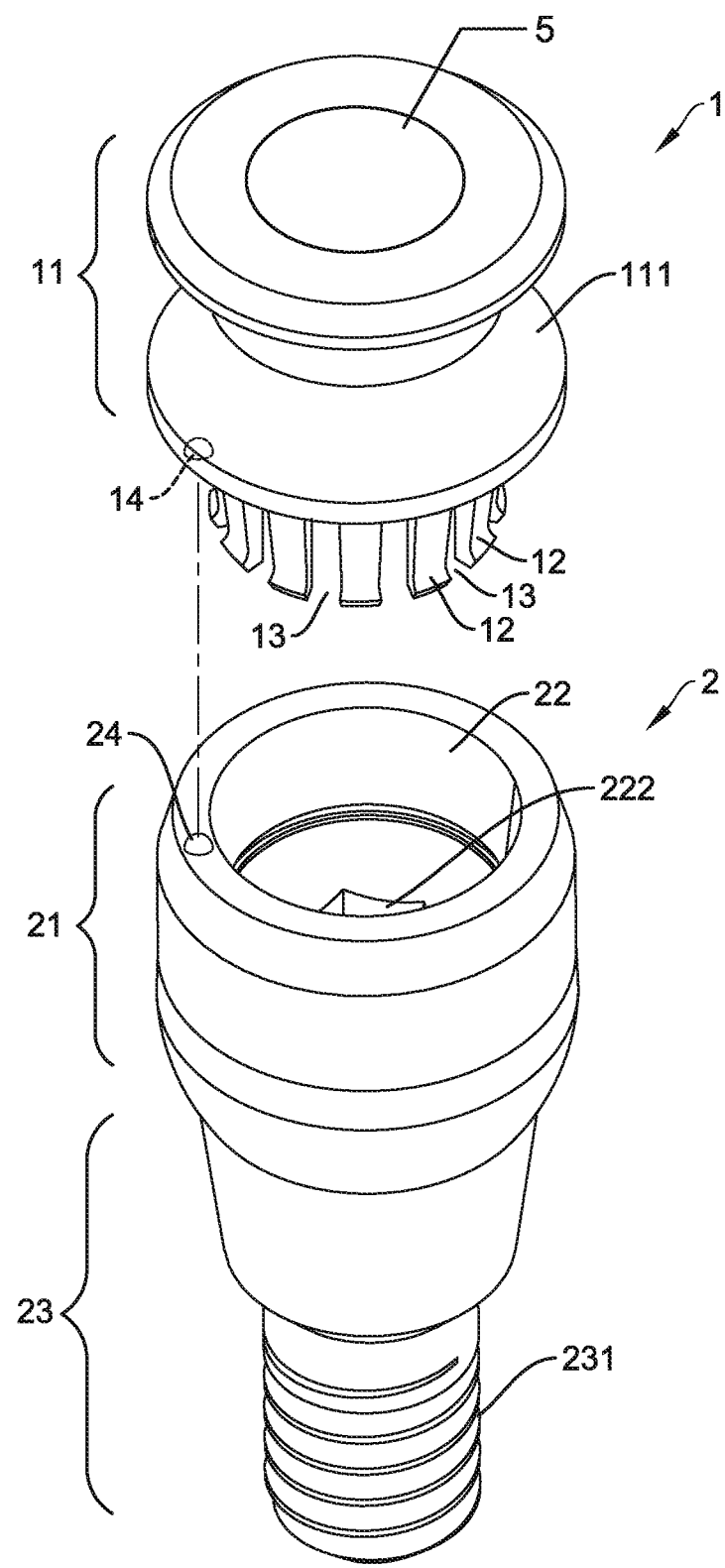
FIG. 10 is an exploded perspective diagram according to a combined assembly for dental prosthesis of a fourth embodiment of the present disclosure.

Referring to FIG. 10, a combined assembly for dental prosthesis of a fourth embodiment of the present disclosure is illustrated. In order to prevent the dental prosthesis from rotating arbitrarily, a means for preventing rotation may be added between the opposing elements. In the embodiment, the first body 11 is provided with a concave hole 14, and the second body 21 is provided with a convex block 24 corresponding to the concave hole 14, so that the first body 11 may be prevented from rotating arbitrarily with respect to the second body 21.

Figure 11:
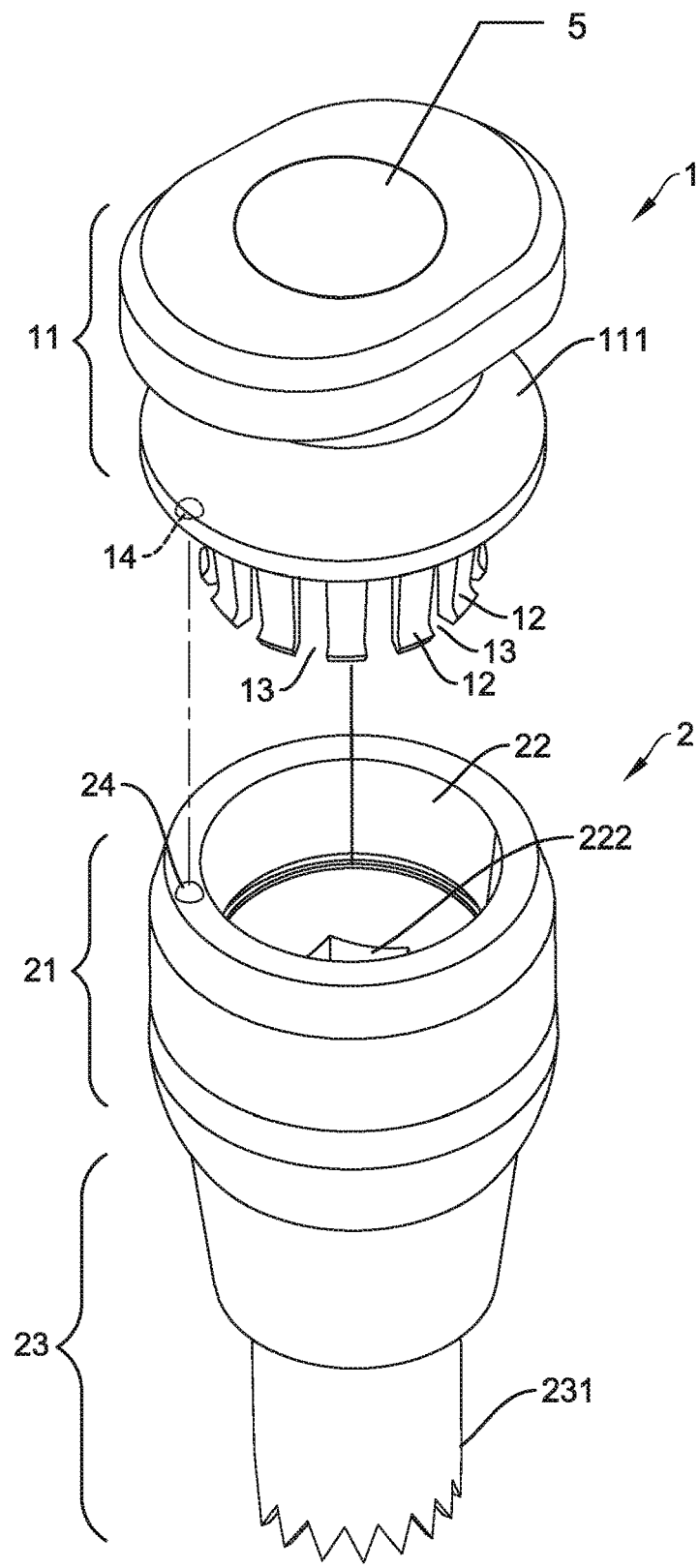
FIG. 11 is an exploded perspective diagram according to a combined assembly for dental prosthesis of a fifth embodiment of the present disclosure.

Referring to FIG. 11, a combined assembly for dental prosthesis of a fifth embodiment of the present disclosure is illustrated. Similarly, in order to prevent the dental prosthesis from rotating arbitrarily, a means for preventing rotation may also be directly added to the component. In the embodiment, the top of the first body 11 forms a non-circular shape. When the first body 11 is embedded in the crown of the dental prosthesis, and will not rotate relative to the crown. In addition, means for preventing rotation may also be added directly to the implant. In the embodiment, the bottom of the extension portion 23 forms a non-flat zigzag shape, so that the second joint member 2 may be prevented from rotating arbitrarily.

The present disclosure has been described with preferred embodiments thereof and it is understood that many changes and modifications to the described embodiments can be carried out without departing from the scope and the spirit of the invention that is intended to be limited only by the appended claims.

What is claimed is:

1. A combined assembly for dental prosthesis, comprising:
a first joint member including a first body and a plurality of elastic hooks, wherein the elastic hooks are annularly arranged to connect one end of the first body, a slot is disposed between the adjacent elastic hooks, and each of the elastic hooks includes a top portion protruding outward;

a second joint member including a second body, wherein the second body is provided with a joint hole, a side wall surface of the joint hole is provided with a ring groove, the elastic hooks extend into the joint hole, and the top portions of the elastic hooks engage into the ring groove; and a supporting member including a filling portion and a stopping portion, wherein the first joint member is provided with a through hole, the filling portion is coupled to the through hole, and the stopping portion is located inside the elastic hooks.

2. The combined assembly for dental prosthesis according to claim 1, wherein the first body is provided with an annular groove.

3. The combined assembly for dental prosthesis according to claim 1, wherein the second body is provided with an extension portion on a side of the joint hole, and the extension portion is provided with a screw.

4. The combined assembly for dental prosthesis according to claim 3, wherein a driving portion is provided at a bottom of the joint hole.

5. The combined assembly for dental prosthesis according to claim 3, wherein the combined assembly further comprises a third joint member, the third joint member is provided with a matching hole and a bolt, the screw is combined with the matching hole, and the bolt is configured to be drilled into a skeleton.

6. The combined assembly for dental prosthesis according to claim 1, wherein a guide surface is provided on an outer end of each of the elastic hooks.

7. The combined assembly for dental prosthesis according to claim 6, wherein the joint hole is a tapered hole, and the guide surface is elastically deformed by compression of the tapered hole during a jointing process of the first joint member and the second joint member.

8. The combined assembly for dental prosthesis according to claim 1, wherein the combined assembly further comprises a restraining ring, and an outer surface of the first joint member and an outer surface of the second joint member are sleeved by the restraining ring.

9. The combined assembly for dental prosthesis according to claim 8, wherein a plurality of protrusions are disposed on an outer surface of the restraining ring.

10. The combined assembly for dental prosthesis according to claim 1, wherein the first body is provided with a concave hole, and the second body is provided with a convex block corresponding to the concave hole.

11. The combined assembly for dental prosthesis according to claim 1, wherein the first body is provided with an external thread.

12. The combined assembly for dental prosthesis according to claim 1, wherein a via hole is provided at a bottom of the joint hole of the second body.

13. The combined assembly for dental prosthesis according to claim 1, wherein a hooking surface is provided on an outer surface of each of the elastic hooks, and the hooking surface forms a curved surface connected to the top portion.

14. The combined assembly for dental prosthesis according to claim 1, wherein a gap is formed between the stopping portion and each of the elastic hooks.

\* \* \* \* \*